United States Patent [19]
Rice

[11] 3,710,568
[45] Jan. 16, 1973

[54] INTEGRAL TUBING AND/OR ELECTRICAL LEAD SUPPORT AND MOUNTING PAD FOR GAS TURBINE ENGINE CONTROLS AND ACCESSORIES

[75] Inventor: Joe R. Rice, Cincinnati, Ohio
[73] Assignee: General Electric Company
[22] Filed: Aug. 12, 1971
[21] Appl. No.: 171,065

[52] U.S. Cl. ............60/39.31 R, 137/608, 339/119 R
[51] Int. Cl. ................................................F02c 7/20
[58] Field of Search ..........60/39.31, 39.32; 137/608; 339/119 R

[56] References Cited
UNITED STATES PATENTS 2,978,869  4/1961  Hiscock et al.......................60/39.31
3,234,963  2/1966  Lyon....................................137/608
3,269,118  8/1966  Benedict et al......................60/39.31

FOREIGN PATENTS OR APPLICATIONS 991,356  5/1965  Great Britain......................60/34.31

Primary Examiner—Douglas Hart
Assistant Examiner—Warren Olsen
Attorney—Derek P. Lawrence et al.

[57] ABSTRACT

A new tubing (or electrical lead) support is combined with a new gas turbine engine control and accessory mounting pad, which also serves to communicate fluids/electrical signals to such controls and accessories to provide a more compact and easily maintained gas turbine engine. Tubing is permanently or semi-permanently bonded to the engine casing and the tubing is terminated in a shear face pad which provides "plug in" mounting pads for the controls and accessories.

14 Claims, 9 Drawing Figures

PATENTED JAN 16 1973 3,710,568
SHEET 1 OF 2
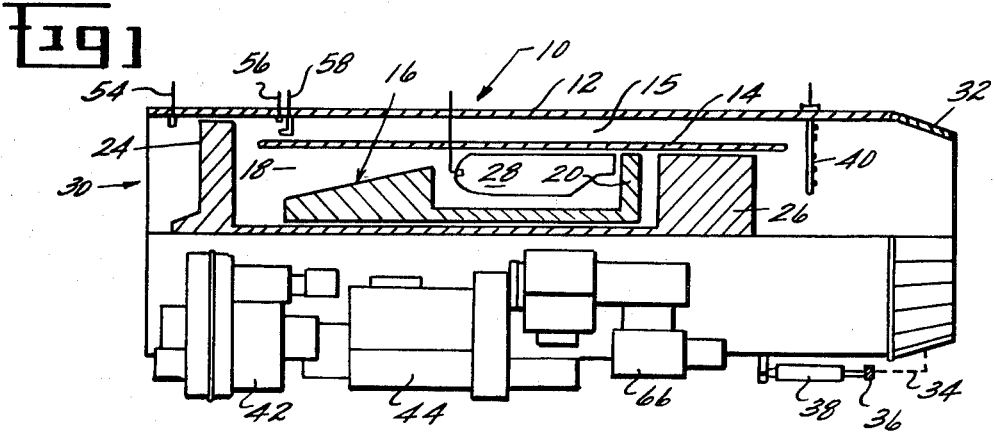
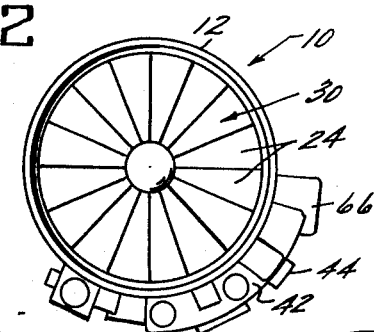
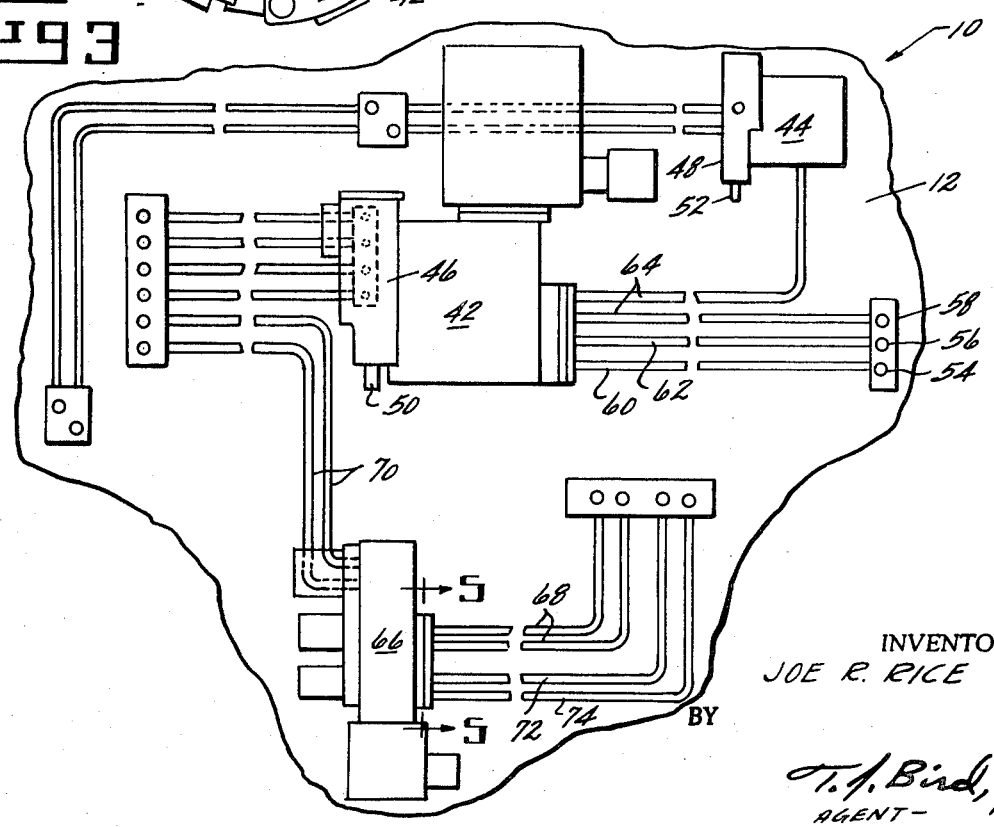
INVENTOR.
JOE R. RICE
BY T. A. Bird, Jr
AGENT

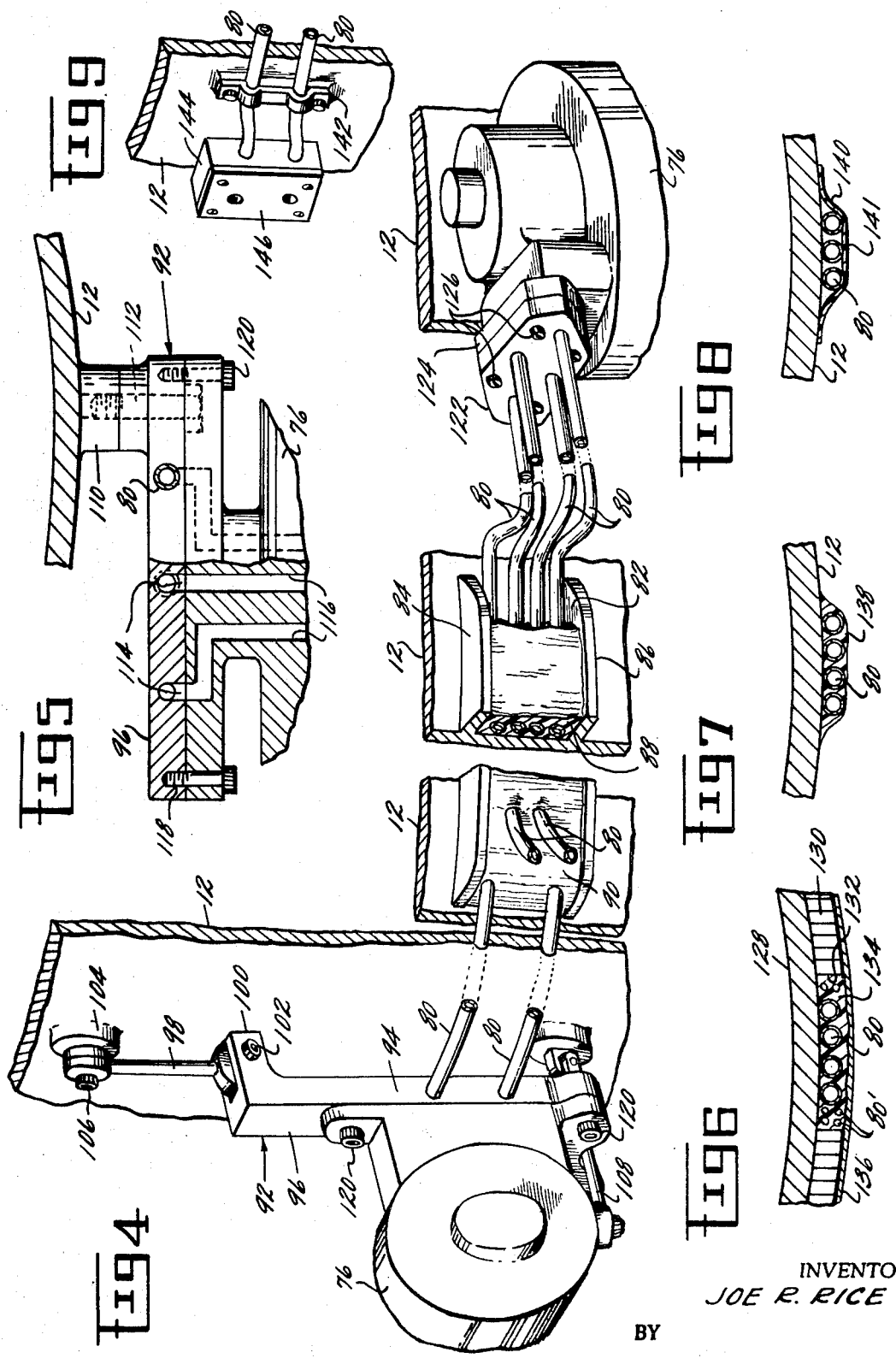

3,710,568

INTEGRAL TUBING AND/OR ELECTRICAL LEAD SUPPORT AND MOUNTING PAD FOR GAS TURBINE ENGINE CONTROLS AND ACCESSORIES

BACKGROUND OF THE INVENTION

This invention relates generally to tube and electrical lead supports and, more particularly, to a combined electrical lead and tubing support which also provides a mounting pad for control and accessory components of a gas turbine engine. The invention herein described was made in the course of or under a contract or a subcontract thereunder, with the United States Department of the Air Force.

Advanced turbojet and turbofan engine designs for aircraft propulsion are becoming increasingly complex with regard to control and accessory mounting and location. Advanced designs require an increasingly large number of engine controls and accessories (hereafter normally referred to as controls), such as gearboxes, main and, possibly, augmenter fuel controls, hydraulic nozzle actuators, electronic temperature and pressure sensors, and the like. Most, if not all, of these controls are mounted externally of the gas turbine engine. That is, the controls are normally mounted to a casing which surrounds the gas turbine engine.

Associated with these controls in an enormous amount of tubing for transmitting fluid media and electrical cabling. For example, tubing is required to transmit fuel from the fuel tanks to a fuel control and from the fuel control to the fuel injection points of the engine. As another example, tubes are required to deliver lubricating oil from an oil tank to any location on the engine which requires lubrication. Further, hydraulic oil tubes are required to deliver hydraulic fluid from a suitable source to hydraulic control mechanisms, such as hydraulic nozzle actuators which vary the exhaust area of the engine. Finally, electrical cabling is required to provide control signals for the above-mentioned, and many other components of the engine. As is the case with the controls themselves, all of this tubing and cabling is also mounted externally of the gas turbine engine.

The size of an aircraft gas turbine engine is dictated by the airframe installation envelope, which normally imposes severe space limitations on the gas turbine designer. In addition, weapon system availability, or in the case of commercial aircraft, utilization factors, are determined by the ease of maintenance and the resultant maintainability index (maintenance man hours per engine flight hour). Unfortunately, each of the various engine controls normally has associated with it a great number of these tubes and electrical cables, which normally surround, or protrude from the controls and connect to various locations on the control. This not only increases the envelope size of the engine but also requires the removal of each and every tubing connection and electrical cable connection before the control or accessory can be removed from the engine.

SUMMARY OF THE INVENTION

It is an object of this invention, therefore, to provide a combined tubing/lead support and control mounting pad, which also provides for communication of fluids and electrical signals to such controls and which reduces the envelope size of a gas turbine engine while permitting quick and easy removal of such engine controls.

Briefly stated, the above and other related objects are achieved by adopting a "printed circuit" concept for tubing and electrical leads wherein such tubing and leads are permanently or semi-permanently attached to or made an integral part of the gas turbine engine duct/casing and provided at their termination points with "plug in" mounting pads for engine controls. In one embodiment, the tubes and leads are routed through a honeycomb duct/casing structure within troughs machined in the honeycomb, with the tubes/leads being bonded to the duct and to each other with an epoxy filler. A fiberglass overlay or other appropriate cover is then used as in normal honeycomb duct manufacture. The tubes and/or leads terminate in a shear face pad which can be utilized not only to communicate fluid and/or electrical signals to a control but also to serve as a mounting flange face for the control.

DESCRIPTION OF THE DRAWINGS

While the specification concludes with a series of claims which distinctly claim and particularly point out the subject matter which applicant regards as his invention, an understanding of the invention will be gained from the following detailed description. This description is given in connection with the attached drawings, in which:

FIG. 1 is a schematic view, with portions deleted, of a gas turbine engine incorporating the subject invention;

FIG. 2 is a schematic end view of the gas turbine engine of FIG. 1;

FIG. 3 is a plan view of a portion of the bottom of the engine of FIG. 1;

FIG. 4 is an enlarged perspective view, with portions removed, of a mounting system incorporating the present invention;

FIG. 5 is a partial sectional view, with portions removed, taken along line 5—5 of FIG. 3;

FIGS. 6, 7, and 8 are partial sectional views showing alternative methods of mounting tubing; and FIG. 9 is a view similar to FIG. 4, showing an alternative mounting system.

DESCRIPTION OF A PREFERRED EMBODIMENT

Referring to the drawings wherein like numerals correspond to like elements throughout, attention is directed initially to FIG. 1 wherein a turbofan gas turbine engine 10 is shown schematically to include an outer casing 12 and a concentric inner casing 14 forming a fan duct 15 therebetween. A core engine is disposed within the casing 14 and comprises a rotor having at one end a compressor 16, which forms a converging annular passage 18 and at the other end a turbine 20. The engine further comprises a second rotor having at one end a low pressure compressor or fan 24 and at its opposite end a fan turbine 26 which drives the fan 24. In highly simplified terms, operation of this engine involves compression of an annular air stream by the compressor 16 in the passage 18. Ignition of fuel in a combustor 28 generates a high energy gas stream which first passes through the turbine 20 to drive the core engine compressor 16 and then passes through the fan turbine 26 to drive the fan 24.

Air entering the engine inlet, generally indicated at 30, is initially compressed by the fan 24. A portion of this compressed air enters the core engine to generate the hot gas stream as described above. The remaining portion of compressed air passes through the fan duct 15. The hot gas stream leaving the combustors 28 first performs work on the turbine 20 to drive the compressor 16 and then performs work on the low pressure turbine 26 to drive the fan 24. The hot gas stream then mixes with the air stream exiting from the fan duct 15 and is discharged through an exhaust nozzle 32 to provide a propulsive force.

To provide a desired propulsive force consistent with other operating parameters, the exhaust nozzle 32 is of the variable area type and comprises a plurality of leaves or fingers which are mechanically interconnected as indicated by the broken line 34 to an actuation ring 36. The actuation ring 36 is longitudinally shifted, relative to the casing 12, by a plurality of system-type actuators 38 (only one of which is shown) to increase or decrease the exit area of the nozzle 32. The structure described to this point is conventional and is well-known to those skilled in the art.

In order to obtain a greater propulsive force, it is also known to burn additional fuel either in the hot gas stream or in the fan duct air stream, or after a mixing of the two streams, prior to its exiting through the exhaust nozzle 32. This is generally referred to as augmented or afterburner operation. In the present embodiment, combustor means in the form of afterburner fuel nozzles 40 are provided in an area downstream of the fan duct 15 to direct fuel to the mixture of gas leaving the fan duct 15 in the low pressure turbine 26.

In order to control the propulsive output (thrust) of the engine 10, it is necessary that the engine 10 be provided with a number of basic controls and accessories. For example, the amount of fuel delivered to both the combustors 28 and the afterburner nozzles 40 must be closely controlled. For this reason, the engine 10 is provided with a main fuel control, shown schematically at 42, and an augmenter fuel control, shown at 44. The main fuel control 42 and the augmenter fuel control 44 operate to deliver fuel to the respective combustion systems by means of fuel pumps 46 and 48, respectively. The main fuel pump 46 and the augmenter fuel pump 48 are each supplied with fuel from a suitable source (not shown) by means of tubing 50 and 52 (FIG. 3).

In a normal installation, the main fuel pump 46 and the augmenter fuel pump 48 deliver fuel to their respective combustion systems as a function of Mach number and/or engine speed. In order to provide an indication of the Mach number, the gas turbine engine 10 may be provided with an inlet pressure tap 54, a fan stream static pressure tap 56, and a fan stream dynamic pressure tap 58. The output of each of these pressure taps is normally connected to the fuel controls 42 and 44 by means of suitable tubing, e.g., tubes 60, 62, and 64, as shown in FIG. 3.

In addition to the fuel controls discussed above, the propulsive output of the engine 10 is further controlled by means of the variable area exhaust nozzle 32. The actual area of the nozzle 32 is set by means of a nozzle area control 66, which controls the actuators 38 in a well-known manner. The nozzle area control 66 normally has both fluid and electrical inputs as shown schematically by lines 68 and 70 and controls the amount of hydraulic fluid delivered to the actuators 38 through hydraulic lines 72 and 74.

While the above description is typical of many gas turbine engines, those skilled in the art will be readily aware of the fact that only a few of the many controls and accessories associated with a typical gas turbine engine have been described. The above description is given solely to place the present invention in perspective in that the present invention includes a new tubing (or electrical lead) support combined with a new component mounting pad and fluid/electrical signal communicating device for the many controls, such as those described above, associated with a gas turbine engine. With this in mind, attention is now directed to FIG. 4 wherein a tubing and electrical lead layout constructed in accordance with the present invention is shown. The layout is depicted for two typical controls, which are designated by the numeral 76. The controls 76 are interconnected by means of a plurality of tubes 80. While four of the tubes 80 are shown, the number of such tubes will vary greatly depending upon the particular control. Furthermore, it should be readily apparent that the tubes 80 may be used for the transmission of fluids, such as fuel, oil, hydraulic oil, etc., or may be used as conduits for electrical leads.

As further shown in FIG. 4, the tubes 80 are positioned within a U-shaped trough 82 formed by a pair of leg members 84 and 86 which extend from the engine casing 12. The tubes 80 may be positioned within the trough 82 either singularly, side-by-side, multiple-stack, or in any other arrangement. The tubes are then bonded to the engine casing 12 and/or to each other with an epoxy filler, as indicated by the numeral 88. A fiberglass overlay 90, or other appropriate cover, may then be positioned over the epoxy filler 88, if necessary. While they are not shown, embedded clamps may be used as a normal practice or optionally to further assure retention of the tubes 80 within the trough 82.

As further shown in FIG. 4, the tubes 80 terminate in a shear pad 92 which serves not only as a fluid/electrical signal communicating device for the control 76 but also serves as a mounting pad for the control 76. For this reason, the shear pad 92 includes a first flat side 94 from which the tubes 80 extend and a flat surface 96, which serves as a mounting pad for the control 76. While shown to be a flat plate, the surface 96 could be manufactured to any configuration to accept a mating surface of the control 76.

As further shown in FIG. 4, the shear pad 92 is connected to engine casing 12 by means of a connecting rod 98. One end of the connecting rod 98 is attached to an arm 100 which extends from the shear pad 92 by means of any suitable connectors, such as bolts 102. The opposite end of the connecting rod 98 is connected to a boss 104 which extends from the casing 12 by means of a bolt 106. With such a mounting system, either end of the connecting rod 98 may be left free to rotate thereby permitting slight misalignment and/or movement of the shear pad 92.

In the embodiment shown in FIG. 4, the opposite end of the shear pad 92 is not mounted directly to the casing 12, but instead is mounted to the casing 12 indirectly through a connecting rod 108 which is attached directly to the control 76.

In many cases it may be desirable, or necessary, to rigidly connect the shear pad 92 to the casing 12. One such design is shown in FIG. 5 wherein the shear pad 92 is attached to a boss 110 extending from the casing 12 by means of one or more bolts 112. As further shown in FIG. 5, the shear pad 92 includes a plurality of openings 114 in the mounting face 96 for communicating fluid (electrical signals) to passageways 116 located internally of the controls 76. Furthermore, the mounting face 96 includes one or more openings 188, which receive suitable connectors such as bolts 120, which attach the controls 76 to the shear pad 92.

Referring back to FIG. 4, the opposite ends of the tubes 80 from those which terminate in the shear pad 92 are shown to terminate in a second type of shear pad 122 which does not serve as the sole mounting pad for the control 76. In this embodiment, the control 76 would be mounted directly to the engine casing 12 in any suitable manner, while the tubes 80 are connected to the control 76 through the shear pad 122. For this reason, the shear pad 122 is rigidly connected to a mounting pad 124, which forms a portion of the control 76, by means of bolts 126. While the shear pad 122 does not serve the dual functions of the shear pad 92, the shear pad 122 does cut down on maintenance in that all fluid and electrical connections to the control 76 are made and broken through the shear pad 122. Thus, removal of the bolts 126 is all that is necessary to break all of the fluid and electrical connections to the control 76. While the use of the shear pad 122 may be dictated by certain design constraints, the use of the shear pad 92 is more desirable in that this type of construction not only eliminates the need for individual connectors protruding up from the casing surface 12, which in itself cuts down on maintenance handling damage, but also eliminates the need for separate mounting brackets for the controls and accessories.

While a number of possible embodiments of the present inventive concept have been described in connection with FIGS. 4 and 5, those skilled in the art will readily recognize other types of attachment methods which would fit within this broad inventive concept. For example, instead of equipping the casing 12 with the trough 82, at least a portion of the casing 12 could be made, as shown in FIG. 6, to include a structural skin portion 128 which is surrounded by a honeycomb structure 130. Troughs 132 are machined within the honeycomb structure 130 at any location wherein tubing/electrical leads must be routed. The tubes 80 or electrical leads 80' are positioned within the troughs 132 in any desired arrangement. The tubes are then bonded to the structural skin portion 128 and/or to each other with an epoxy filler, as indicated by the numeral 134. A fiberglass overlay 136, or other appropriate cover, may then be positioned on top of the honeycomb structure 130 as in normal honeycomb duct manufacture. Embedded clamps may be used as a normal practice or optionally to further assure retention of the tubes within the troughs 132.

As shown in FIG. 7, instead of machining or constructing a trough within the honeycomb structure 130, the tubes/leads could be placed on the outer surface of the casing 12 and either singularly or multiply fixed to the casing 12 by use of an epoxy or a fiberglass overlay 138. Here again, embedded clamps could be used to assure retention of tubes or leads, if necessary. Such tubes and leads would again terminate in shear pads similar to those described in connection with FIGS. 4 and 5.

In cases where it may be desirable or necessary to remove the tubing or electrical leads, another alternative method of attachment, as shown in FIG. 8, may be used. This method is similar to that described in connection with FIG. 7 in that the tubing or electrical leads are positioned against the outer surface of the casing 12. A flexible cover 140 is then provided around the tubing and connected to the casing 12 in any suitable manner. The cover 140 may be provided with an opening or slot 141 at any suitable location for the removal of the tubes or electrical leads.

One further aspect of the present invention is that the shear pads 92 and 122, described in connection with FIGS. 4 and 5, may also be provided in connection with tubes and/or electrical leads which are not permanently attached to the casing 12. That is, as shown in FIG. 9, the tubing 80 may be connected to the casing 12 by means of suitable brackets 142, a portion of which may be integrally formed with the casing 12 or connected thereto in any known manner. At the location of each engine control or accessory, the tubing 80 would terminate in a shear face pad 144 which would again provide a mounting flange face 146 for such controls or accessories. This type of construction would provide many of the advantages of the construction shown in connection with FIGS. 4 and 5 and would provide the further advantage of being able to reposition the engine controls and accessories during the early phases of an engine design. Once the position of the controls is frozen in the engine design, the tubing could then permanently be attached to the casing 12, if desired.

What I claim is:

1. In a gas turbine engine of the type including a casing defining an internal flow path, a compressor, a combustion system, a turbine for driving the compressor, and a plurality of casing-mounted controls for regulating the operation of said engine, the improvement comprising:

a combination mounting pad and fluid/electrical signal communicating device for one of said engine controls, said device including a first face for receiving a mating face of the control and a second face having one or more tubes extending therefrom, said first face including one or more openings which cooperate with said tubes to communicate fluid/electrical signals to the mounted control.

2. The improved mounting pad recited in claim 1 further characterized in that said first face includes a second set of openings for receiving means for rigidly connecting the control to said first face.

3. The improved mounting pad recited in claim 2 further including means for connecting said device to the engine casing.

4. The improved mounting pad recited in claim 2 in combination with means for permanently connecting said tubes to the engine casing.

5. The combination recited in claim 4 wherein said tube connecting means includes a trough formed on the exterior of said casing for receiving said tubes.

6. The combination recited in claim 5 wherein said tubes are positioned within said trough and are bonded to said casing by means of an epoxy filler.

7. The combination recited in claim 4 wherein said tubes are connected to said casing by means of an epoxy cement.

8. The combination recited in claim 4 wherein said tubes are connected to said casing by means of a flexible cover which surrounds said tubes and which is attached to said casing.

9. The combination recited in claim 8 wherein said flexible cover includes an opening for removal of said tubes.

10. In a gas turbine engine with an exterior casing a mounting pad for a gas turbine engine control comprising a first face for receiving a mating face of said control, said first face including means for connecting the control thereto, a second face extending generally perpendicular to said first face and having one or more fluid communicating tubes extending therefrom, and means for connecting said mounting pad to the exterior casing of the engine.

11. The mounting pad recited in claim 10 wherein said means for connecting said pad to the casing provide a rigid connection.

12. The mounting pad recited in claim 11 wherein said connecting means include one or more bosses extending from said casing for receiving bolts which attach said mounting pad to said casing.

13. The mounting pad recited in claim 10 wherein said connecting means provide a flexible mount whereby slight movement of said pad with respect to said casing is possible.

14. The mounting pad recited in claim 13 wherein said connecting means includes one or more connecting rods extending from and connected to a pivot point formed on said casing.

* * * * *